United States Patent [19]
Grove

[11] 3,835,695
[45] Sept. 17, 1974

[54] METER PROVING APPARATUS AND METHOD

[75] Inventor: Marvin H. Grove, Houston, Tex.

[73] Assignee: M & J Valve Company, Houston, Tex.

[22] Filed: Apr. 7, 1972

[21] Appl. No.: 242,125

Related U.S. Application Data

[63] Continuation of Ser. No. 219,432, Jan. 20, 1972, abandoned.

[52] U.S. Cl. .................................................... 73/3
[51] Int. Cl. ............................................ G01f 25/00
[58] Field of Search .................... 73/3; 15/104.06 A; 251/325

[56] References Cited
UNITED STATES PATENTS

| | | | |
|---|---|---|---|
| 3,504,523 | 4/1970 | Layhe | 73/3 |
| 3,638,475 | 2/1972 | Grove et al. | 73/3 |
| 3,643,489 | 2/1972 | Davis et al. | 73/3 |
| 3,678,730 | 7/1972 | Barrett, Jr. | 73/3 |
| 3,777,545 | 12/1973 | Grove et al. | 73/3 |

FOREIGN PATENTS OR APPLICATIONS

| | | | |
|---|---|---|---|
| 1,201,762 | 2/1973 | Great Britain | 73/3 |

*Primary Examiner*—Richard C. Queisser
*Assistant Examiner*—Daniel M. Yasich
*Attorney, Agent, or Firm*—Flehr, Hohbach, Test, Albritton & Herbert

[57] ABSTRACT

A meter prover apparatus and method of the type making use of a metering pipe and an interchange connecting the ends of the pipe which uses a piston-like plunger having sealing means which fit into a launching sleeve interposed in the interchange, the spheres being successively moved through the sleeve and launched into the metering pipe by reciprocation of the plunger. The complete cycle is carried out in such a manner as to avoid jamming of spheres in the interchange. At the beginning and during a prover run leakage past the plunger is detected by reference to the pressure differential between the line and the space between the plunger sealing means. Also the seal integrity of each sphere can be checked to insure absence of fluid bypass about the sphere during a run.

5 Claims, 11 Drawing Figures

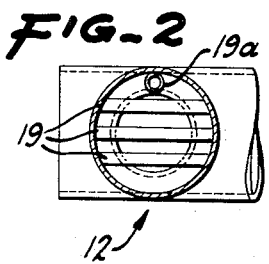
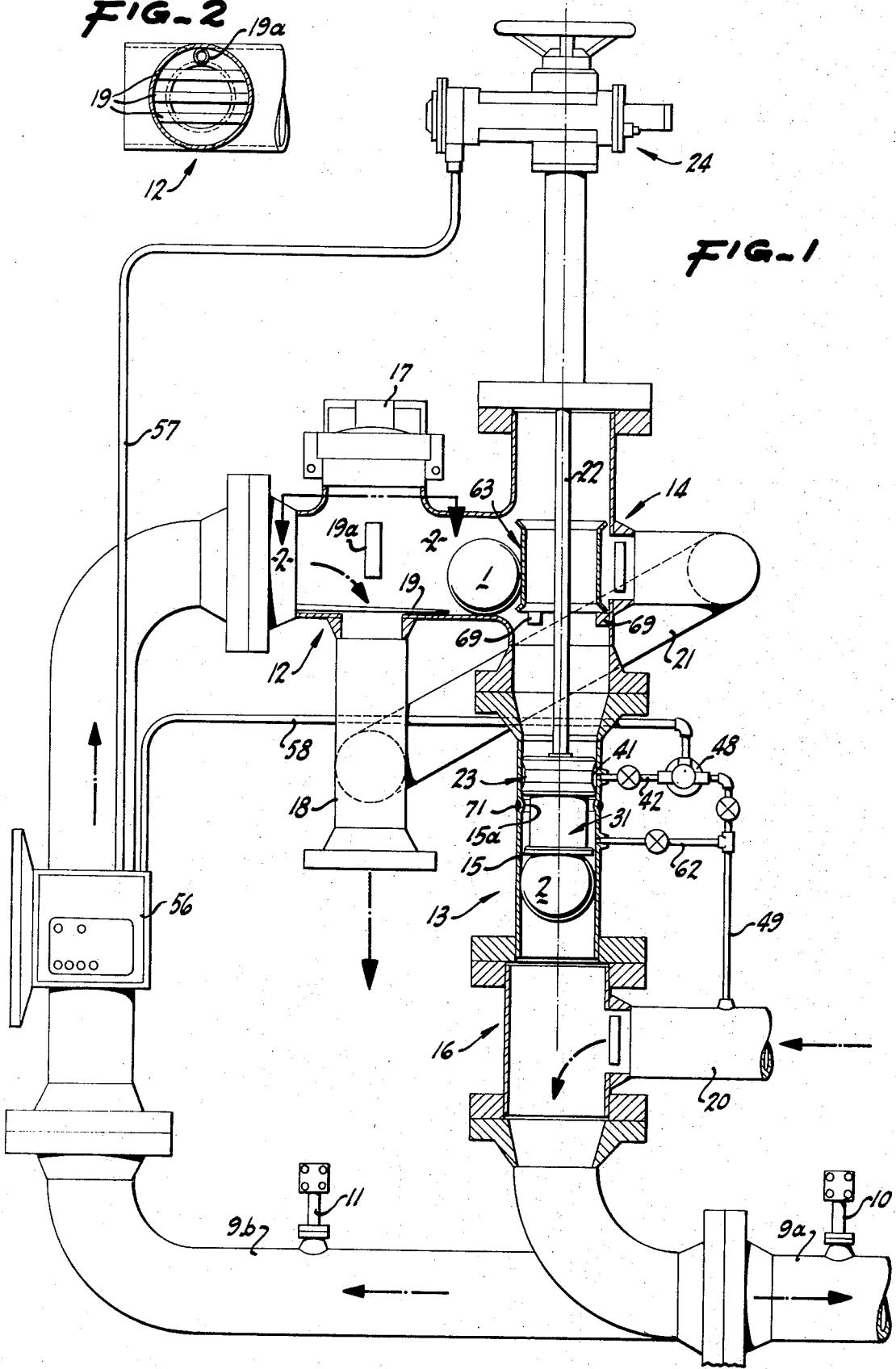

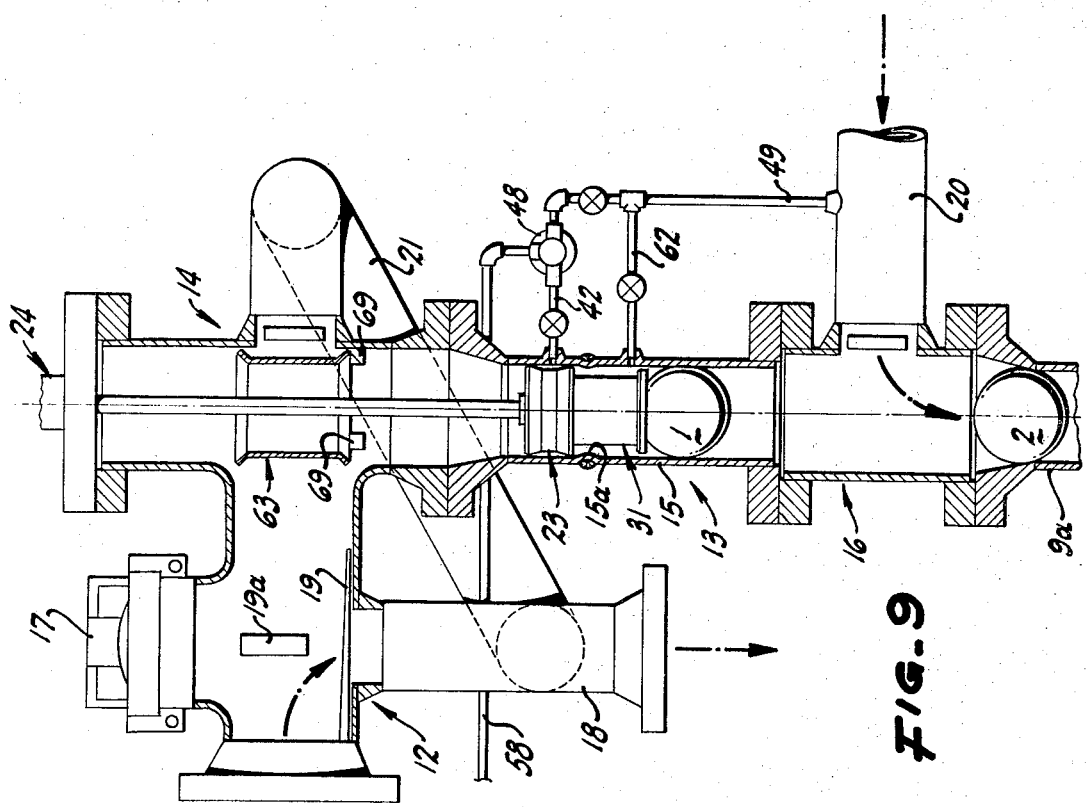
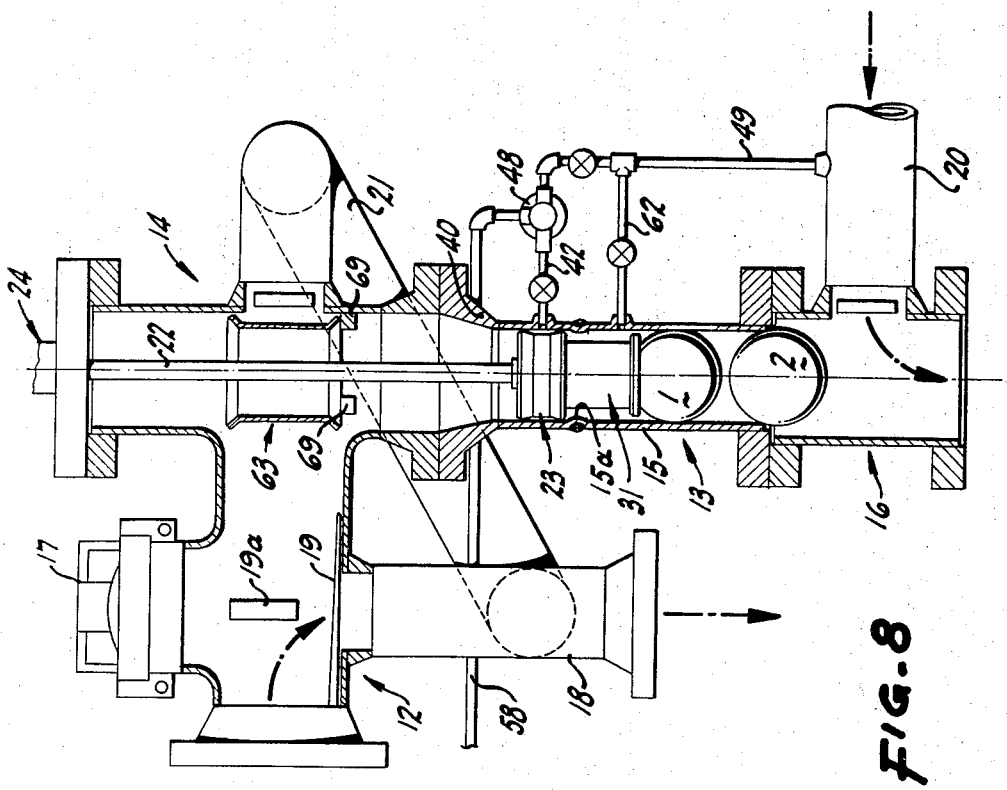

3,835,695

METER PROVING APPARATUS AND METHOD

CROSS-REFERENCE TO RELATED APPLICATION

Reference is made to copending applications Ser. No. 183,758 filed Sept. 27, 1971, now U.S. Pat. No. 3,777,545 and Ser. No. 219,432 filed Jan. 20, 1972. This application is a continuation in part of Ser. No. 219,432, now abandoned.

BACKGROUND OF THE INVENTION

This invention relates generally to flow meter proving apparatus and method such as are employed in conjunction with pipeline transmission systems.

In the installation and operation of pipeline transmission systems for the handling of various liquids, it is recognized that conventional flow metering devices of the position displacement or turbine types are subject to serious inaccuracies which may be cumulative. Thus it is common to use so-called meter provers which make accurate periodic checks of the flow for calibration of the meter. One conventional form of meter prover consists of an extended length of metering pipe of uniform internal diameter and through which the main flow of the piping system can be directed. Some means is employed to enable a plug or sphere to be launched into the inlet end of the metering pipe whereby it is flow propelled through the pipe to the outlet end, where it is available for relaunching into the inlet end. That part of the apparatus which forms a connection between the inlet and outlet ends of the metering pipe for retrieving a sphere at the end of a metering run and for relaunching it into the inlet end of the metering pipe is commonly known as an interchange. As shown in U.S. Pat. No. 3,387,483, the interchange may make use of valves through which the sphere passes before reaching launching position. By means of an associated electrical system which is activated when the sphere passes through sphere detecting stations near the inlet and outlet ends of the metering pipe, a flow reading is obtained for the time interval which is required for the travel of the sphere between the detecting points. This reading is then taken together with the known calculated volume of the metering pipe between the detecting points to provide accurate calibration data. It has been found important to detect any leakage through the interchange during a metering run. A system making use of leak detecting means is shown in U.S. Pat. No. 3,423,988.

Another meter proving apparatus and method (see application Ser. Nos. 183,758 and 219,432) makes use of a sleeve connected in the interchange together with a plunger which can be reciprocated into and out of the sleeve. The plunger forms an interchange seal and also effects the launching of a sphere from the barrel. A guard is associated with the piston rod and prevents movement of a sphere into the barrel when the plunger is in a projected position. Leakage past the plunger is detected by venting the space between the plunger sealing members and thereafter noting any rise in pressure. While such apparatus is greatly simplified compared to prior art meter provers, there is a need for an effective means and method which will enable the operator to determine any leakage through the interchange at the beginning and throughout the prover run. Also there is need for an effective means and method for determining the seal integrity of each sphere, or in other words, its ability to prevent fluid bypass during movement through the prover pipe.

SUMMARY OF THE INVENTION AND OBJECTS

It is an object of the present invention to provide an improved meter prover apparatus and method of the type described above.

Another object of the invention is to provide an improved means and method to detect leakage through the interchange before and during a meter proving run.

A further object is to provide a means and method for determining the seal integrity of each sphere, thereby insuring against fluid bypass during a proving run.

Additional objects and features of the invention will appear from the following description in which the preferred embodiment has been illustrated in conjunction with the accompanying drawing.

BRIEF DESCRIPTION OF THE DRAWING

FIG. 1 is a side elevational view in section illustrating apparatus incorporating the present invention, including the interchange portion and its connections with the inlet and outlet ends of the metering pipe.

FIG. 2 is a detail in cross-section taken along the section line 2—2 of FIG. 1.

FIGS. 6 – 10 are side elevational views in section showing the interchange and associated parts in different operating positions.

DESCRIPTION OF THE PREFERRED EMBODIMENTS

Figures 3, 4, 5:
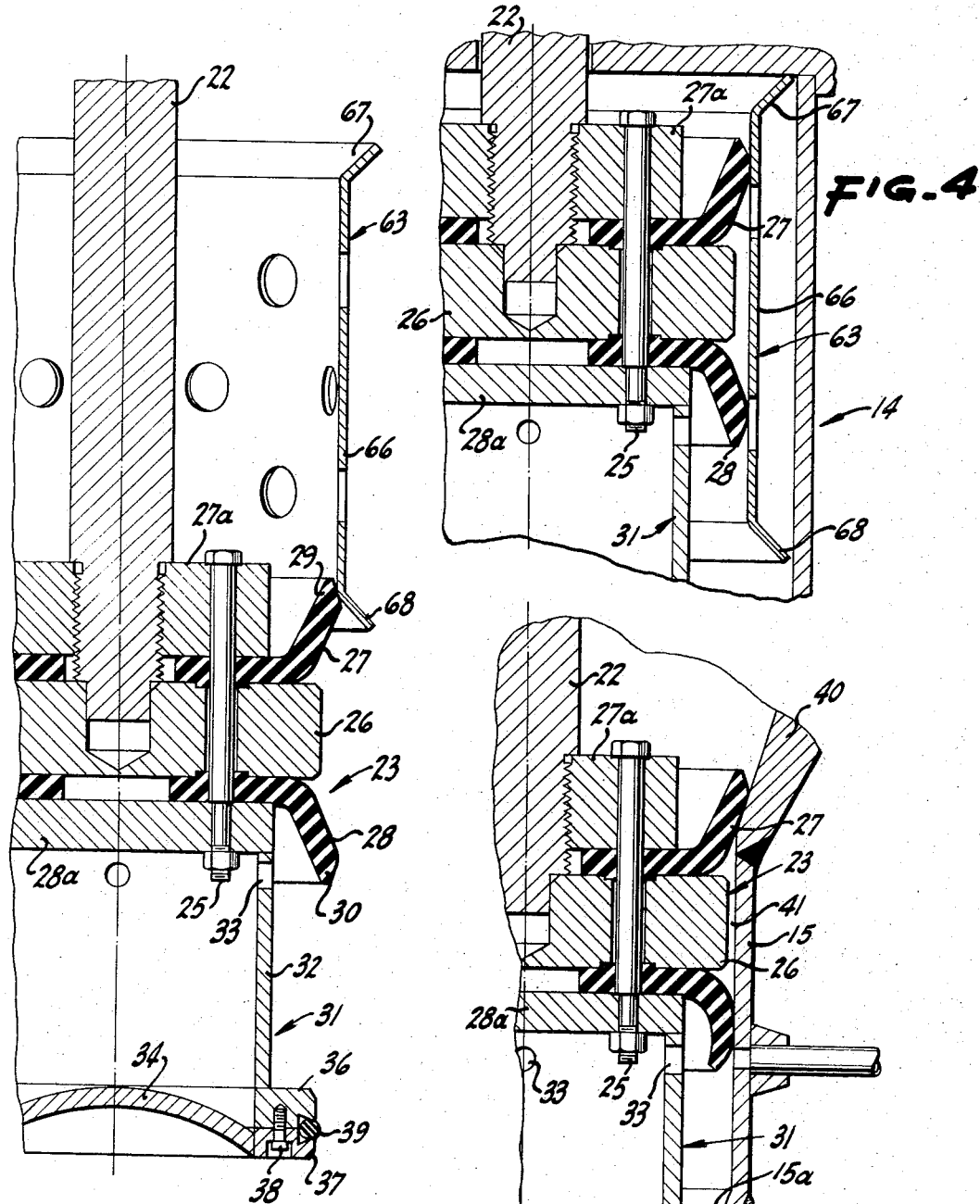
FIG. 3 is an enlarged detail in section showing the plunger assembly and guard means.
FIG. 4 is an enlarged detail in section showing the plunger in retracted position and within the guard means.
FIG. 5 is a view like FIG. 6 but showing the plunger within the interchange sleeve.

FIGS. 1 – 5 show meter proving apparatus of the type shown in said application Ser. Nos. 183,758 and 219,432. FIG. 1 shows the inlet and outlet ends 9a and 9b of a metering pipe which may be an extended loop of pipe of uniform internal diameter through which the main flow of a piping system can be directed. The plug or sphere which is flow propelled through this pipe is dimensioned to have a snug fit whereby there is no leakage past the sphere. The spheres are commonly made of resilient material such as synthetic rubber, and have diameter slightly larger than the internal diameter of the metering pipe. The metering pipe is also provided near its inlet and outlet ends with the sphere detectors 10 and 11 which may be conventional, and which, for example, may consist of an electrical switch which is operated when the sphere contacts a sensing element of the detector. The ends of the metering pipe are interconnected by the flow-tee 12 and interchange 13, which in this instance includes tee 14, sleeve 15 and tee 16.

The flow-tee 12 is provided with a removable access cover 17 through which spheres can be introduced or removed. Also its lower side connects with the pipe 18 through which liquid is discharged as it leaves the outlet end of the metering pipe. Barrier bars 19 are provided and have their upper edges inclined to form ramps sloped downwardly toward the tee 14. The tee 12 may in some instances be inclined to promote movement of spheres through the same and into the upper portion of the interchange. The tee 14, which forms one end portion of the interchange 13, directly connects with tee 12 and also with the sleeve 15. The other end of sleeve 15 makes direct connection with tee 16 which connects with inlet end 9a of the metering pipe and also has a side connection to the main flow inlet pipe 20. A bypass line 21 provides fluid communication between the tee 14 and the outlet pipe 18 and prevents fluid in the interchange in front of the returning sphere from impeding movement of the sphere beyond the upper inlet opening of pipe 18 and into the interchange The diameter of this line may be comparable to that of pipe 18.

Spheres may tend to dwell when in a position directly over the upper end of pipe 18. This tendency can be prevented by a rib or bar 19a (FIG. 2) which is fixed on the inner surface of one side of tee 12 and alongside the upper end of pipe 18. A sphere passing through the tee is deflected off center by rib 19a, whereby it cannot dwell directly over the upper open end of pipe 18.

The internal diameter of sleeve 15 can be about the same as the internal diameter of the metering pipe whereby when a sphere is moved into the sleeve its surfaces provide sealing contact with the inner surfaces of the sleeve. However, it is provided with an intermediate portion 15a of restricted diameter which can be formed by the method presently explained. The two parts of the sleeve extending from the restriction 15a may be termed first and second parts, corresponding to the upper and lower parts as shown in FIG. 1.

The tee 14 serves to mount a rod 22 which carries a piston-like plunger 23 at its inner end. The exterior end of rod 22 is connected with suitable means to effect its reciprocation in a controlled manner. This may be a power operator 24 of the electrical type, or a hydraulic operator of the cylinder piston type.

The sealing means for the plunger 23 is shown in FIGS. 3, 4 and 5. A metal disk 26 is shown on one end of the operating rod 22, and this disk carries the resilient sealing members 27 and 28. The members 27 and 28 are formed cuplike, thus providing resilient annular sealing skirts 29 and 30. They are made of a suitable resilient material, such as a synthetic rubber or elastomer. Members 27 and 28 are clamped against the faces of disk 26 by annular clamping members 27a and 28a, which are engaged by the bolts 25. A plunger extension 31 is mounted on member 28a and is adapted to engage an underlying sphere. It can consist of a cylindrical shell 32 provided with openings 33 and carrying a concave sphere engaging member 34 at its lower end. Thus force against the sphere is distributed evenly over a substantial area of the sphere to avoid any substantial sphere distortion. Members 32 and 34 may be secured together by the flanges 36 and 37, and screws 38 and the flange assembly may be recessed to accommodate the ring 39 of suitable material like nylon. This arrangement serves to guide the plunger into the sleeve and does not form a seal. The tapered entrant section 40 immediately above the upper end of the sleeve 15 facilitates entrance of the sealing member 28 into the sleeve when the plunger is moved downwardly toward the sleeve from a retracted position.

When the plunger is in the position shown in FIG. 1, the upper sealing member 27 seals against pressure applied to its upper side, thus preventing any leakage through the interchange during a meter proving run.

For the purpose of leak detection, means is provided for establishing fluid communication between the space 41, between members 27 and 28 and means located exterior of the interchange. Thus a valve controlled pipe 42 connects with an opening in one side of the sleeve 15, and this opening is located between restriction 15a and the upper end of the sleeve 15. Thus the pipe 42 is in communication with space 41 for the projected plunger position shown in FIG. 1.

It has been discovered that when plunger 23 is projected into sleeve 15 the pressure in space 41 drops below line pressure by an amount which can be readily measured. In particular installations, the pressure differential will depend upon the pipe size of the meter prover and the line pressures. In general, the differential may be of the order of 15 p.s.i. when the static line pressure is about 30 p.s.i. or higher. When the static line pressure is less than 30 p.s.i., the differential pressure tends to be about one-half the static line pressure. This drop in pressure is attributed to shape distortion of the members 27 and 28 when they enter the sleeve 15. This pressure drop is employed to indicate any leakage that may occur past the plunger at the beginning and during a proving run.

FIG. 1 shows a switch 48 of the differential pressure operated type which has its fluid chamber connected to pipe 42 and another connection through pipe 49 with the inlet pipe 20. The contacts of the switch close one circuit when the difference between the pressure supplied to the switch through pipes 42 and 49 is above a predetermined value, such as 5 p.s.i., and to open the first circuit and close a second circuit when the pressure differential drops below a predetermined set value. These conditions can be indicated to the attendant in any suitable manner as by red and green indicator lights connected to the circuits.

Figure 11:
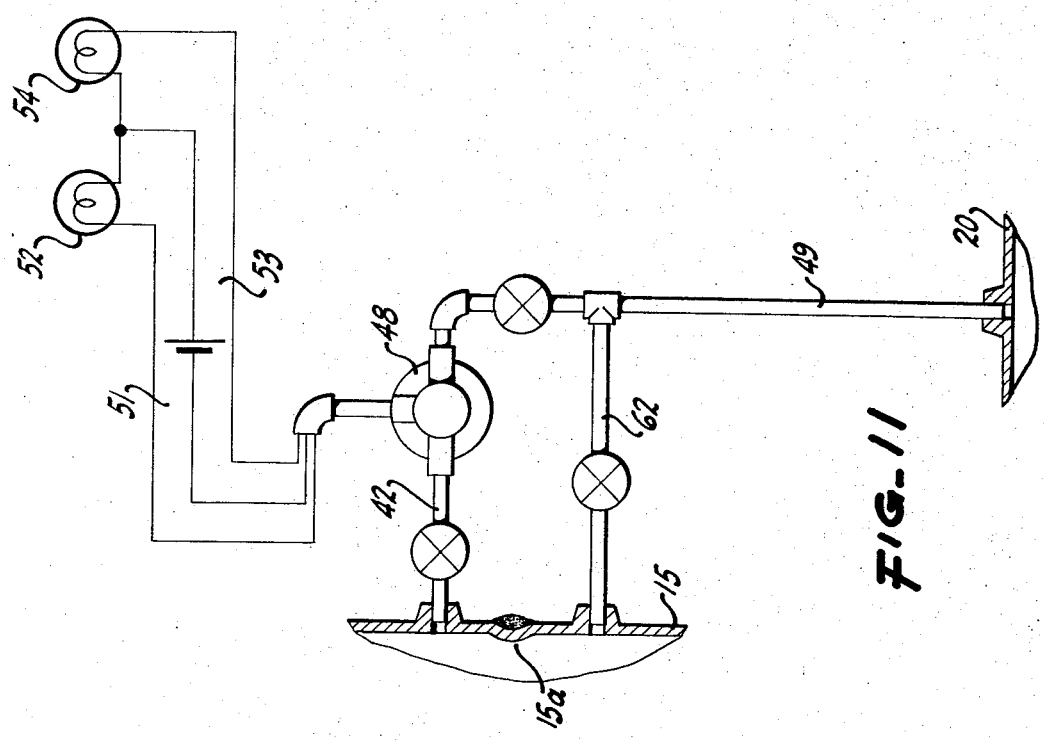
FIG. 11 is a circuit diagram for the differential pressure switch and indicating means.

FIG. 11 shows a simple circuit for the switch 48. Contacts connect in series with circuit 51 which includes the indicator light 52. Also switch contacts connect in series with circuit 53 which includes the indicator light 54.

In FIG. 1 a control box 56 is shown, and the panel of this box may carry indicator lights in the circuits 51 and 53 controlled by the switch 48. An electrical conduit 57 is shown extending from this box to the electrical motor of the operator 24. Another conduit 58 may carry the circuit wires leading from the switch 48 to the control box. The arrangement is such that the attendant by manipulating the controls of box 56 may raise or lower the plunger between its limiting positions, or may arrest movement of the plunger in a particular position.

Guards means 63 is provided to prevent movement of a sphere into a position within the path of travel of the plunger when the plunger is retracted to permit a sphere to move to the inlet end of the sleeve 15. It is in the form of a shell 66 (FIGS. 3-4) that is perforated and circular in section (e.g., generally cylindrical). It surrounds rod 22 above the plunger 23. Flanges 67 and 68 are formed on the ends of the shell and loosely fit the interior of tee 14, thereby providing guide means. In its lowermost position, shell 66 is adapted to rest on the lugs 69. The inner diameter of the shell is sufficient to accommodate the plunger 23, whereby when the plunger is retracted it is received within the cup. Preferably the inner diameter of the guard is slightly less than the relaxed diameter of members 27 and 28, thereby providing some frictional retention. The guard 63 when in its lower position on lugs 69 effectively blocks movement of a sphere into a position where it is in the path of movement of the plunger, and therefore its blocking action insures plunger movement without interference. This blocking action of guard 63 is shown in FIG. 1.

The restricted portion 15a of sleeve 15 can be made in the following manner. During fabrication an annulus 71 of weld metal is applied about the portion of the sleeve to be restricted making use of conventional welding equipment. Shrinking of the applied annulus of weld metal, taking place during cooling, serves to apply sufficient force to the walls of the sleeve to effect permanent deformation with a slight reduction in diameter (e.g., 1/16 inch for a sleeve 8 inches in diameter). Such a restriction is sufficient to require substantial extra force to move a sphere through the same.

Figure 6:
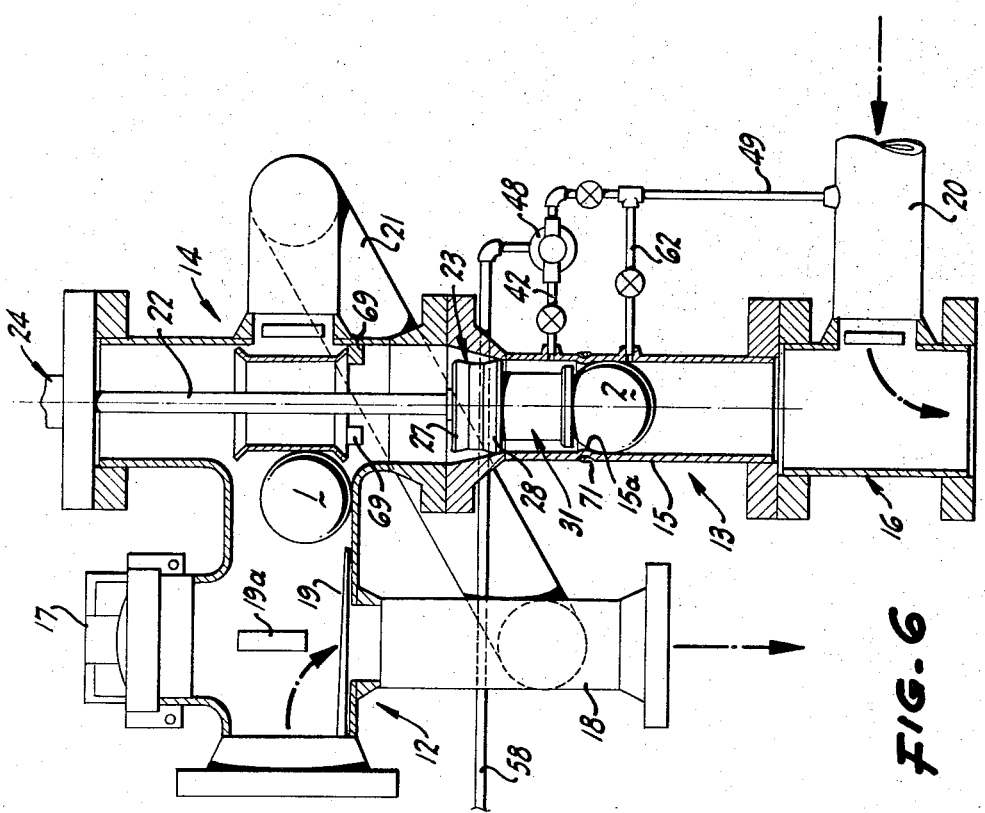

A preferred method of operating the apparatus described above is as follows. It is assumed that two spheres are being used, numbered 1 and 2, and that line flow is occurring through the pipe 20. FIG. 1 shows the positioning of the spheres and other parts of the meter prover at the end of the previous run. The projected plunger 23 is within that part (i.e., the first part) of the sleeve 15 above the restriction 15a. Both of the sealing members 27 and 28 have sealing engagement with the inner surface of the sleeve. The extension 31 is in juxtaposition with the sphere 2, the latter being located in that part (i.e., the second part) of the sleeve below restriction 15a. The sphere 1 is disposed against the guard 66, and therefore cannot interfere with retracting movement of the plunger. To initiate a proving run, the attendant at the control box 54 causes the electrical operator 24 to be energized to start retraction movement of the plunger. For the initial part of this movement, suction (i.e., differential hydraulic pressure) is applied to sphere 2 to move the same to a position a short distance (e.g., 1 inch) below the restriction 15a. When suction ceases to be applied, the sphere may be urged against restriction 15a by the differences between static pressures applied to its upper and lower sides. FIG. 6 shows the plunger after such initial retraction movement, with its sealing member 28 at the upper end of the sleeve 15 and with the sealing member 27 fully retracted from the sleeve. The sphere is shown in engagement with restriction 15a. Thus further movement of the sphere under static pressure differential is prevented. As movement of the plunger continues, it engages the guard 66 in the manner shown in FIG. 3, thus raising this guard until it reaches its limiting position. Thereafter further movement of the plunger to its limiting position causes it to be disposed within the guard in the manner shown in FIGS. 4 and 7. The retraction of both the plunger and the guard leaves the sphere 1 free to move to the position shown in FIG. 7 where it is at rest in engagement with the upper end of the sleeve 15.

Figure 7:
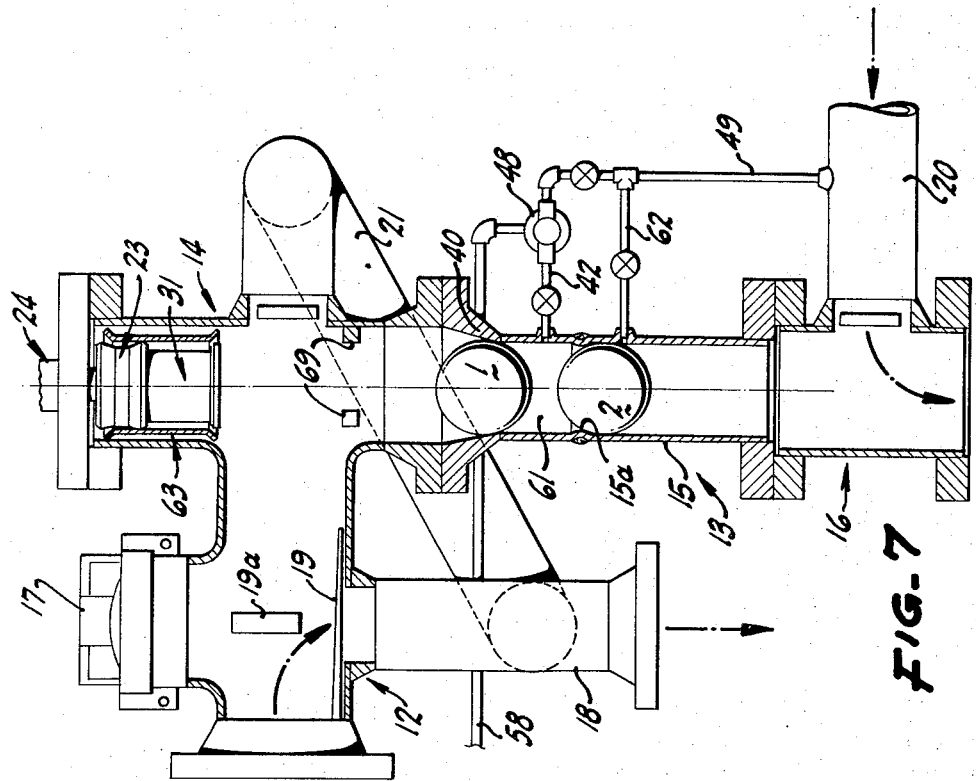

The attendant now energizes the operator 24 to move the plunger together with the guard toward the sleeve. After the initial part of this movement, the guard 66 comes to rest upon the lugs 69, with the result that it assumes the same position shown in FIG. 1 to block sphere 2 at the end of the proving run. In its downward movement the plunger extension 31 comes into contact with the sphere 1 and forces this sphere into the sleeve 15. At this time the spacing between the centers of spheres 1 and 2 is greater than the diameter of each sphere, whereby the spheres are spaced apart and not in direct physical contact. The space between the two spheres, indicated at 61 in FIG. 7 provides in effect a hydraulic cushion which transmits force from sphere 1 to sphere 2 without physical distortion of either sphere other than the distortion required to enter the sleeve 15. The spheres retain this spaced relationship until the sphere 2 reaches the lower end of the sleeve 15 where it is launched into the fluid flow from the line 20 entering the inlet end 9a of the proving pipe. At that time the plunger is at the end of its stroke and is disposed within the part of the sleeve 15 above the restriction 15a as illustrated in FIGS. 8 and 9. FIG. 8 illustrates sphere 2 at the time it is launched, and FIG. 9 shows the launched sphere 2 about to enter the inlet end 9a of the metering pipe.

Figure 10:
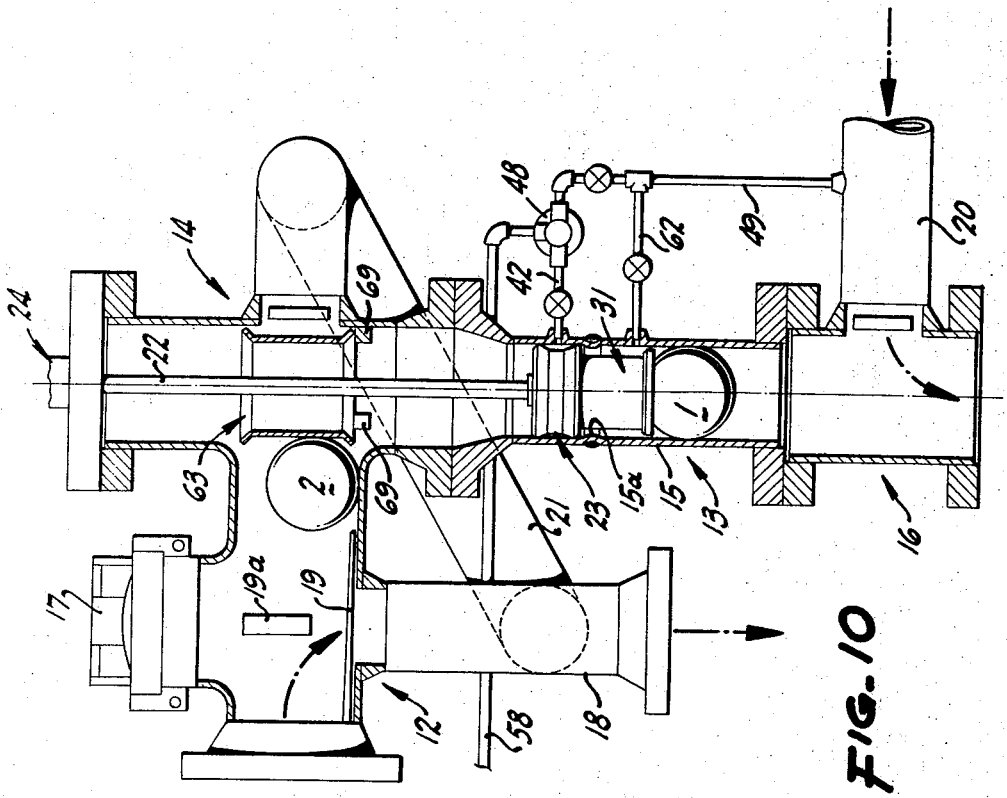

If the pressure differential between pipes 42 and 49 is now above a specified minimum value (e.g., 5 p.s.i.) the contacts of the differential pressure switch 48 are so conditioned that an indicator (e.g., green light) is displayed at the control box 56 so that the attendant is apprised of the fact that no leakage is occurring past the plunger at the beginning of the run. As the run continues and until it is completed, the plunger remains in the position shown in FIG. 9 whereby if any leaks develop during the course of the run, this immediately is indicated to the attendant. At the end of the run the parts are in the positions shown in FIG. 10. The sphere 1 is in the lower part of the sleeve, and the sphere 2 is adjacent the guard 66. A new run is initiated by raising the plunger in the manner previously described.

As previously mentioned, when the plunger is retracted from the sleeve 15 the underlying sphere is caused to be sucked upwardly to a position a short distance below the restriction 15a. This places the sphere in a proper position for subsequent movement to launch the same on the return stroke of the plunger.

When the plunger is moved upwardly a short distance from the position shown in FIG. 1, but without retracting sealing member 27 from sleeve 15, the pressure in the space between the plunger and the underlying sphere becomes substantially less than line pressure. Since the space between the plunger and the underlying sphere is now in communication with switch 48 through pipe 42, the attendant may check to determine whether or not there is any leakage past the sphere by again noting any drop in pressure sensed by the differential pressure switch 48. Only a short holding period of the order of 20 or 30 seconds is required for this check. If the pressure drop is not sustained, then the attendant is apprised accordingly, and the defective sphere is removed and replaced. It will be apparent that failure to maintain a differential pressure under the conditions just described is caused by scoring or mutilation of the sphere whereby some leakage occurs past the same. If such a sphere were used to carry out a metering run, the results would not be accurate.

In FIG. 1, there is an additional normally closed valve controlled line 62 which connects through the wall of the sleeve 15 at a point below the restriction 15a and which permits introduction of fluid from the line 20 into the sleeve. If it is desired to remove a defective sphere from the prover, the line 62 is opened to admit some line fluid above the sphere within the sleeve and the plunger is raised manually until the plunger extension 31 is spaced a substantial distance from the sphere. Thereafter the plunger is moved by the operator 24 to its lowermost position within the sleeve 15 whereby the underlying sphere is forced out from the lower end of the sleeve. When this sphere passes through the metering pipe and arrives at the tee 12, it can be removed by opening the cover 17.

I claim:

1. In a meter prover method making use of apparatus comprising a metering pipe having flow inlet and outlet ends adapted to receive two flow propelled spheres and interchange means connecting the inlet and outlet ends and adapted to receive spheres from the outlet end and selectively to transfer the same to the inlet end, the interchange means including a cylindrical sleeve having an internal diameter such that a sphere may pass through the same with a seal forming fit, the sleeve having first and second parts and an annular portion of restricted diameter located between the ends of the said parts, said parts extending from said portion to the ends of the sleeve, the interchange also including means connecting the ends of the sleeve with the outlet and inlet ends of the metering pipe, the apparatus also including a plunger movable from a retracted position spaced axially from the inlet end of the sleeve to a projected position within the sleeve, the plunger being provided with sealing means serving to form a fluid tight seal when within the sleeve and means at the lower end to evenly distribute the force on a sphere, the method comprising the steps of retracting the plunger from a projected position within the first part of the sleeve and near said restricted portion to a retracted position out of the sleeve and spaced therefrom, simultaneously causing a sphere within the second part of the sleeve to be moved by differential fluid pressure acting on the same to a position near the restricted portion as the plunger is retracted from the first part, causing a second sphere received from the outlet end of the metering pipe to be positioned at that end of the sleeve from which the plunger is retracted, and thereafter moving the plunger toward its projected position whereby the second sphere is forced into the sleeve and through the restriction and both spheres caused to be forced toward the other end of the sleeve to cause launching of the first sphere from the sleeve into the inlet end of the metering pipe, the plunger in its fully projected position being within the first sleeve part with its sealing means having sealing engagement with the inner surfaces of the sleeve.

2. In a meter prover method making use of apparatus comprising a metering pipe having flow inlet and outlet ends adapted to receive two flow propelled spheres and interchange means connecting the inlet and outlet ends and adapted to receive spheres from the outlet end and to transfer the same to the inlet end, the interchange means including a cylindrical sleeve having an internal diameter such that a sphere may pass through the same with a seal forming fit, the sleeve having first and second parts and an annular portion of restricted diameter located between the ends of the same, the interchange also including means connecting the ends of the sleeve with the outlet and inlet ends of the metering pipe, the apparatus also including a plunger movable from a retracted position spaced axially from one end of the first part of the sleeve to a projected position within the first part of the sleeve, the plunger having means forming a seal with respect to the sleeve and means at the lower end to evenly distribute the force on a sphere, the method comprising the steps of moving the plunger to a retracted position out of the first part of the sleeve and spaced therefrom, simultaneously causing differential hydraulic pressure to be applied to a sphere within the second part of the sleeve to move the same to a position near the restricted portion as the plunger is retracted, causing a second sphere received from the outlet end of the metering pipe to be positioned at the end of the second part of the sleeve from which the plunger is retracted, and thereafter moving the plunger toward a projected position within the first part of the sleeve whereby the second sphere is forced into the sleeve with a quantity of trapped fluid between the two spheres and separating the same from direct physical contact, and causing further movement of the plunger toward its fully projected position within the first part of the sleeve to force both spheres toward the other end of the sleeve to cause launching of the first sphere into the inlet end of the metering pipe, the plunger in its fully projected position being within the first part of the sleeve and near said restricted portion.

3. In metering proving apparatus, a metering pipe having flow inlet and outlet ends and adapted to receive flow propelled spheres, interchange means connecting the inlet and outlet ends and adapted to receive spheres from the outlet end and to transfer the same to the inlet end, said interchange comprising a sleeve having upper and lower parts and an internal diameter such that a sphere may pass through the same with a seal-forming fit, the interchange, when vertically disposed, also including means for connecting the upper and lower ends of the sleeve respectively with the outlet and inlet ends of the metering pipe, the length of the sleeve being sufficient to accommodate two spheres, a plunger axially disposed with respect to the sleeve and movable from a retracted position spaced above the upper end of the sleeve to a projected position within the upper part of the sleeve, the plunger having sealing means for sealing with respect to the surfaces of the sleeve and means at the lower end to evenly distribute the force on a sphere, and means for reciprocating the plunger between a projected position within the upper part of the sleeve and a retracted position outside and spaced above the upper end of the sleeve, the plunger when retracted permitting a sphere to move to a position adjacent the upper end of the sleeve and when moved from retracted to a fully projected position within the sleeve serving to force an underlying sphere into the upper part of the sleeve and to launch a preceding sphere from the lower part of the sleeve, said sleeve having an annular portion of restricted diameter located intermediate the upper and lower parts of the sleeve, said portion serving to prevent movement of a sphere from the second to the first part of the sleeve when the plunger is moved from its projected position to retracted position.

4. In liquid proving apparatus, a metering pipe having flow inlet and outlet ends and adapted to receive flow propelled spheres, interchange means connecting the inlet and outlet ends and adapted to receive spheres from the outlet end of the metering pipe and to selectively transfer the same to the inlet end of the metering pipe, said interchange means, when vertically disposed, including a cylindrical sleeve having upper and lower connected parts, the sleeve having an internal diameter such that a sphere may pass through the same with a seal forming fit, the length of the sleeve being sufficient to accommodate two spheres, the sleeve having an annular portion of restricted diameter located between the ends of the upper and lower parts of the sleeve, said interchange also including means providing sphere accommodating upper and lower spaces connecting the outlet end of the metering pipe with the upper end of the sleeve and connecting the inlet end of the metering pipe with the lower end of the sleeve, a plunger member movable from a retracted position spaced axially above the upper end of the sleeve to a projected position within the upper part of the sleeve, resilient sealing means carried by the plunger, the plunger having a seal forming fit with respect to the inner surfaces of the sleeve and means at the lower end to evenly distribute the force on a sphere, and means for reciprocating the plunger between said projected and retracted positions, the plunger when retracted selectively enabling a sphere in the upper sphere accommodating space of the interchange to move to a position adjacent the upper end of the sleeve, and when moved from retracted to a projected position within the sleeve and in sealing engagement therewith serving to force the last named sphere into the sleeve and through the restriction and to cause another sphere that is within the lower part of the sleeve to be dislodged therefrom into the lower sphere accommodating space of the interchange, thereby causing said other sphere to be launched into the inlet end of the metering pipe, said plunger when moved toward retracted position after a sphere launching operation serving to apply pressure differential to the sphere within the lower part of the sleeve whereby such sphere is moved to a position nearer the restriction and the inlet end of the sleeve, said restriction serving as restraining means to prevent movement of such sphere past the same.

5. In meter proving apparatus, a metering pipe having flow inlet and outlet ends and adapted to receive flow-propelled spheres and interchange means connecting the inlet and outlet ends and adapted to receive spheres from the outlet end and to transfer the same to the inlet end, said interchange means comprising a cylindrical sleeve having an internal diameter such that a sphere may pass through the same with a seal-forming fit, the length of the sleeve being sufficient to accommodate two spheres in direct contact, the interchange means also including means forming a first sphere accommodating space connecting the outlet end of the metering pipe with one end of the sleeve and means forming a second sphere accommodating space connecting the other end of the sleeve with the inlet end of the metering pipe, a plunger movable from a position spaced axially from the inlet end of the sleeve to a position within the sleeve, the plunger having sealing means forming a seal with respect to the surfaces of the sleeve and means at the lower end to evenly distribute the force on a sphere, means including a rod to which the plunger is secured for reciprocating the plunger between projected positions within and retracted from the one end of the sleeve, the plunger when retracted permitting a sphere to move in the first space to a position adjacent the inlet end of the sleeve and when moved from retracted position to a position within the sleeve serving to force one sphere into the sleeve to dislodge a preceding sphere to launch the same into the second space and into the inlet end of the metering pipe, guard means serving to prevent movement of a sphere into a position in the path of movement of the plunger when the plunger is moved to a projected position, the guard means comprising a shell disposed in the first space, the shell being annular in section and dimensioned to accommodate the plunger sealing means with frictional retention about the same when the plunger is retracted, and means carried by the interchange to arrest movement of the guard means when the plunger is projected into the sleeve, whereby when the plunger is in its projected position the guard means is in said first space and displaced from the plunger in an axial direction.

* * * * *